United States Patent [19]

Bertelli et al.

[11] 4,420,577

[45] Dec. 13, 1983

[54] SELF-EXTINGUISHING POLYOLEFIN COMPOSITIONS

[75] Inventors: Guido Bertelli; Renato Locatelli, both of Ferrara, Italy

[73] Assignee: Montedison S.p.A., Milan, Italy

[21] Appl. No.: 372,388

[22] Filed: Apr. 27, 1982

[30] Foreign Application Priority Data

Apr. 30, 1981 [IT] Italy ................... 21459 A/81

[51] Int. Cl.$^3$ ..................... C08K 5/36; C08K 5/46; C08K 5/47

[52] U.S. Cl. ................. 524/83; 106/18.22; 523/179; 524/93

[58] Field of Search ............ 524/83, 93; 523/179; 106/18.22

[56] References Cited

FOREIGN PATENT DOCUMENTS 46-5255 2/1971 Japan .

*Primary Examiner*—Stanford M. Levin

[57] ABSTRACT

Self-extinguishing polyolefin compositions consisting of:
(1) from 52 to 96.55% by weight of at least one olefin polymer or copolymer;
(2) from 3 to 30% by weight of a nitrogenous compound selected from amongst 1,3,5-triazines, urea and dicyandiamide;
(3) from 0.3 to 3% by weight of a free-radical promoting compound selected from amongst 2,3-dimethyl-2,3-diphenylbutane and 2,3-dimethyl-2,3-diphenylhexane;
(4) from 0.15 to 15% by weight of a compound of formula $$(R_1-S)_{\overline{n}}R_3 \text{ or (II) } R_2=S, \qquad (I)$$

wherein $R_1$ and $R_2$ are imidazol, uracyl, alkyleneurea or benzotriazol radicals, $R_3$=H, or a metal of Group II (A) or (B), or aluminum.

3 Claims, No Drawings

SELF-EXTINGUISHING POLYOLEFIN COMPOSITIONS

THE PRIOR ART

Different methods are known for imparting to the olefinic polymers self-extinguishing properties. Amongst older ones there may be found those based on the additioning of the polymers with metal compounds, particularly with antimony and bismuth, in combination with thermally unstable halogenated compounds, such as for instance the chlorinated paraffinic waxes.

Said combinations have, however, certain serious drawbacks, such as that of causing the corrosion of the machines used in the processing of polymeric compositions, as well as the emission of noxious fumes and gases in the case of fire.

A more recent research has been directed towards the use, as additives, of combinations free of halogenated compounds, and based on ammonium polyphosphates in admixture with particular nitrogenous organic compounds. These latter, in the case of combustion, give place to a carbonaceous expanded structure that acts as a thermal shield between the flame and the polymer.

Said systems have, however, the drawback of possessing a poor resistance to heat and to thermal oxidation.

THE PRESENT INVENTION

Thus, object of this invention is that of providing polyolefinic compositions endowed with a high level of self-extinguishing properties, and containing a combination of anti-flame additives that will not have the above mentioned disadvantages. Said compositions comprise:
(1) from 52 to 96.55% by weight of an olefinic polymer or copolymer;
(2) from 3 to 30% by weight of a compound selected from amongst 1,3,5-triazines, urea, dicyanamide or derivatives from said compounds;
(3) from 0.3 to 3% by weight of a free-radical promoting compound selected from amongst 2,3-dimethyl-2,3-diphenyl-butane and 2,3-dimethyl-2,3-diphenyl-hexane;
(4) from 0.15 to 15% by weight of a sulphur-nitrogenous compound falling under any one of the following two general formulae (tautomeric):

$$(R_1-S)_n R_3 \quad (I)$$

$$R_2=S \quad (II)$$

wherein: S=a sulphur atom
$R_1$, $R_2$=radicals selected from the groups of
(a) imidazol, wherein $R_1$ and $R_2$ are respectively of the formulae: 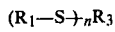

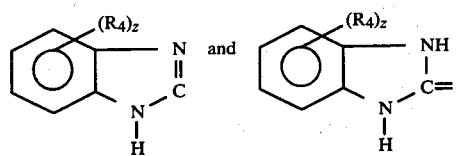

(b) uracyl, with $R_1$ and $R_2$ having respectively the formulae:

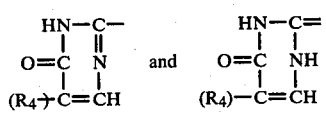

(c) alkyleneurea, with $R_1$ and $R_2$ having respectively the formulae:

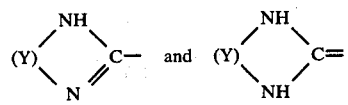

(d) benzothiazol, with $R_1$ and $R_2$ having respectively the formulae:

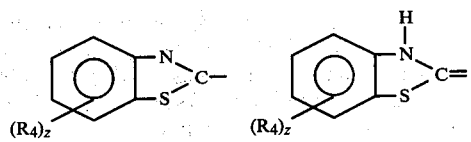

$R_3$=H, or a metal of the Group II (A) or (B) of the Periodic System, or it may be aluminum;
$R_4$=an alkyl radical containing from 1 to 4 carbon atoms, or a halogen, preferably chlorine;
Y=an alkylene radical containing from 2 to 3 carbon atoms, possibly containing substituent groups of type $R_4$;
n=valency of metal $R_3$;
z=number comprised between 0 and 3, extremes included.

Examples of olefinic polymers and copolymers that may constitute the compositions according to this invention are: polypropylene, polypropylene modified with ethylene, propylene mixes with up to 20% by weight of elastomeric ethylene/propylene copolymers containing up to 50% by weight of copolymerized ethylene.

Examples of the compounds defined under point (2) are: melamine, ammeline, ammelide, isocyanuric acid, cyanuric acid and their salts and esters, 2,3,6-triphenyl-triazine; 2,3,6-triazoltriazines, dicyandiamine, urea, guanamine, benzoguanamine.

Examples of the compounds defined under point (4) are: mercaptobenzoimidazol, 4-methylthiouracyl, thiouracyl, ethylenethiourea, mercaptobenzothiazol and their alkyl or halogenated derivatives.

The compositions of this invention may be prepared following conventional methods, for instance by mixing together the polymer with the additives in a Banbury-type mixer, at a temperature equal to or greater than the softening temperature of the polymer, and by then extruding the mixture in an extruder at the temperature most suited for obtaining a granulated product.

In order to determine the self-extinguishing properties of the compositions, the granulated products are molded to small test plates of 3 mm thickness on a Craver-type press, operating at a temperature at least equal to the softening temperature of the polymer, at a pressure of 40 Kg/cm² for 7 minutes. On the test-plates thus obtained the degree or level of self-extinguishing property is determined both by measuring the Oxygen Index (according to ASTM D-2863) which expresses the minimum percentage of oxygen in admixture with nitrogen necessary for the sample to burn continuously, as well as by applying UL-94 rules (edited by Underwriters Laboratories-USA) which provide an evaluation of the degree of quenching capacity of the plastic materials.

In the application of these rules and standards there was adopted the "Vertical Burning Test", which allows to classify the material at levels 94 V-0, 94 V-1 and 94 V-2 on the basis of the combustion time of the test pieces and of the fact of whether they allow or do not allow the falling of lit up particles.

According to this latter method the test piece, maintained in a vertical position, is lit up by approaching to its lower end a flame, effecting two attempts of ignition each of the duration of 10 seconds. Each test was carried out on a group of 5 test pieces, effecting on the same test piece, as a further differentiation criterion, also the measure of the spontaneous extinguishing times for four consecutive ignitions. With respect to the self-extinguishing polymeric compositions of the Prior Art, those of the present invention show an extremely reduced corrosion and fume-emitting capacity or even a total absence of said capacity, a greater thermal stability and a limited concentration of additives at equal flame-resistance.

The following examples are given for purely illustrative purposes and shall not be construed as to limit the inventive idea of this invention.

The compositions of each examples have been prepared as previously herein above described, by using a DOLCI-type extruder having a screw diameter of 20 mm, a length/diameter ratio of the screw=23 and operating at a screw revolving speed of 20 rpm, at a temperature comprised between 200° and 240° C.

EXAMPLE 1

It concerns the compositions from A to E (of which those from A to D are comparative compositions), having the qualitative and ponderal (by weight) composition as well as the characteristics reported on Table I.

TABLE I

|  | A | B | C | D | E |
|---|---|---|---|---|---|
| Polypropylene | 75 | 74 | 70 | 94 | 69 |
| Melamine | 25 | 25 | 25 | — | 25 |
| 2,3-diphenyl-2,3-dimethyl butane | — | 1 | — | 1 | 1 |
| Mercaptobenzoimidazol | — | — | 5 | 5 | 5 |
| Total thermal stabilizers° | 0.5 | 0.5 | 0.5 | 0.5 | 0.5 |
| Oxygen Index: O₂ % | 21.5 | 22.5 | 22.5 | 22 | 27 |
| Classification according to UL-94 | B°° | V-2 | B | B | V-2 |
| Quenching time for 4 consecutive ignitions (sec.) | — | 4/5 5/4 | — | — | 1-1-1-1 |

EXAMPLE 2

It concerns compositions from A to E having the qualitative and by weight constitution reported on Table II, together with their self-extinguishing properties.

TABLE II

|  | A | B | C | D | E |
|---|---|---|---|---|---|
| Polypropylene | 75 | 75 | 75 | 75 | 75 |
| Melamine | 21 | 21 | 21 | 21 | 21 |
| 2,3-diphenyl-2,3-dimethylbutane | 1 | 1 | 1 | 1 | 1 |
| Mercaptobenzoimidazol | 3 | — | — | — | — |
| Zn salt of mercaptobenzoimidazol | — | 3 | — | — | — |
| 4-methyl-thiouracyl | — | — | 3 | — | — |
| Ethylenthiourea | — | — | — | 3 | — |
| Mercaptobenzothiazol | — | — | — | — | 3 |
| Total thermal stabilizers (IRGANOX + TPL) | 0.5 | 0.5 | 0.5 | 0.5 | 0.5 |
| Oxygen Index: O₂ % | 25 | 23 | 26 | 24 | 24.5 |
| Classification according to UL-94 standards | V-2 | V-2/B | V-2 | V-2 | V-2 |
| Quenching time for 4 consecutive ignitions secs. | 4-2-1-1 |  | 1-1-1-1 | 7-8-5-5 | 4-5-7-9 |

EXAMPLE 3

It concerns the compositions having the qualitative and quantitative (by weight) constitution reported on TABLE III, with the corresponding self-extinguishing characteristics.

TABLE III

|  | A | B | C | D | E | F | G | H | I | L | M | N | O | P |
|---|---|---|---|---|---|---|---|---|---|---|---|---|---|---|
| Polypropylene | 74 | 69 | 86 | 77.5 | 75.5 | 89.5 | 87.5 | 74 | 69 | 86 | 77.5 | 75.5 | 89.5 | 87.5 |
| Melamine | 25 | 25 | 12.5 | 20 | 20 | 8 | 8 | 25 | 25 | 12.5 | 20 | 20 | 8 | 8 |
| Mercaptobenzoimidazol | 0 | 5 | 2.5 | 1.5 | 3.5 | 1.5 | 3.5 | — | — | — | — | — | — | — |
| 4-methylthiouracyl | — | — | — | — | — | — | — | 0 | 5 | 2.5 | 1.5 | 3.5 | 1.5 | 3.5 |
| 2,3-diphenyl-2,3-dimethylbutane | 1 | 1 | 1 | 1 | 1 | 1 | 1 | 1 | 1 | 1 | 1 | 1 | 1 | 1 |
| Thermal stabilizers (IRGANOX + TPL) | 0.5 | 0.5 | 0.5 | 0.5 | 0.5 | 0.5 | 0.5 | 0.5 | 0.5 | 0.5 | 0.5 | 0.5 | 0.5 | 0.5 |
| Oxygen Index: O₂ % | 22.5 | 27 | 23.5 | 24.5 | 25.5 | 22.5 | 23 | 22.5 | 27.5 | 24.5 | 24.5 | 26.5 | 23.5 | 24.5 |
| Classification accord. UL-94 | V-2 | V-2 | V-2 | V-2 | V-2 | burns | burns | V-2 | V-2 | V-2 | V-2 | V-2 | V-2/B | V-2 |
| Quenching time for 4 consecutive ignitions (in secs.) | 4-5 5-4 | 1-1 1-1 | 10-8 4-5 | 3-5 4-5 | 3-4 3-5 | — | — | 4-5 5-4 | 1-1 1-1 | 2-2 1-2 | 1-1 1-1 | 1-1 1-1 | — | 1-1 1-1 |

EXAMPLE 4

It concerns the compositions whose qualitative and quantitative (by weight) constitution is reported by TABLE IV, with the corresponding self-extinguishing properties.

TABLE IV

|  | A | B | C | D | E |
|---|---|---|---|---|---|
| Polypropylene | 75 | 75 | 75 | 75 | 75 |
| Melamine | 21 | — | — | — | — |
| Ammelide | — | 21 | — | — | — |
| Ammelide | — | — | 21 | — | — |
| Isocyanuric acid | — | — | — | 21 | — |
| Dicyandiamide | — | — | — | — | 21 |
| Mercaptobenzoimidazol | 3 | 3 | 3 | 3 | 3 |
| 2,3-diphenyl-2,3-dimethylbutane | 1 | 1 | 1 | 1 | 1 |
| Thermal stabilizers (IRGANOX + TPL) | 0.5 | 0.5 | 0.5 | 0.5 | 0.5 |
| Oxygen Index: | 25 | 24.5 | 24 | 24.5 | 23 |

TABLE IV-continued

|  | A | B | C | D | E |
|---|---|---|---|---|---|
| O₂ % | | | | | |
| Classification according UL-94 | V-2 | V-2 | V-2 | V-2 | V-2 |
| Quenching times in seconds | 4-5-5-4 | 8-10-7-10 | 10-10-7-5 | 2-3-2-3 | 2-2-2-2 |

EXAMPLE 5

It concerns the compositions having the qualitative and quantatitive (by weight) constitution reported by TABLE V, together with the corresponding self-extinguishing properties.

TABLE V

|  | A | B | C | D | E | F |
|---|---|---|---|---|---|---|
| Ethylene/propylene copolymer° | 0 | 0 | 0 | 0 | 5 | 10 |
| Polypropylene | 75.5 | 75 | 74.5 | 76 | 70 | 65 |
| Melamine | 21 | 21 | 21 | 21 | 21 | 21 |
| Mercaptobenzoimidazol | 3 | 3 | 3 | 3 | 3 | 3 |
| 2,3-diphenyl-2,3-dimethyl-butane | 0.5 | 1 | 1.5 | — | 1 | 1 |
| 2,3-diphenyl-2,3-dimethyl-hexane | — | — | — | 1 | — | — |
| Thermal stabilizers (IRGANOX + TPL) | 0.5 | 0.5 | 0.5 | 0.5 | 0.5 | 0.5 |
| Oxygen Index: O₂ % | 23.5 | 25 | 25.5 | 24.5 | 25 | 24.5 |
| Classified according UL-94 | V-2 | V-2 | V-2 | V-2 | V-2 | V-2 |
| Quenching time in seconds | 5-7-4-4 | 4-2-4-1 | 1-1-1-1 | 3-5-5-4 | 3-4-4-3 | 5-5-4-3 |

°containing 57% by weight of ethylene.

What I claim is:
1. Self-extinguishing polyolefinic compositions consisting of:
    (1) from 52 to 96.55% by weight of an olefinic polymer or copolymer;
    (2) from 3 to 30% by weight of a compound selected from the group consisting 1,3,5-triazines, urea and dicyandiamide;
    (3) from 0.3 to 3% by weight of a free-radical promoting compound selected from the group consisting of: 2,3-dimethyl-2,3-diphenyl-butane and 2,3-dimethyl-2,3,diphenyl-hexane;
    (4) from 0.15 to 15% by weight of a sulphur-nitrogenous compound having either one of the following two (2) general formulae:

$(R_1-S)_nR_3$      (I)

$R_2=S$      (II)

wherein:
S = sulphur atom
$R_1$, $R_2$ = radicals selected from the group consisting of
    (a) imidazol, in which $R_1$ and $R_2$ are respectively of the formulae:

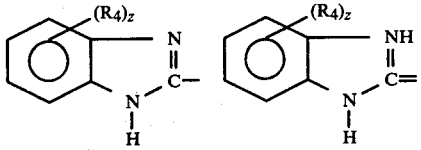

(b) uracyl, with $R_1$ and $R_2$ respectively having the formulae:

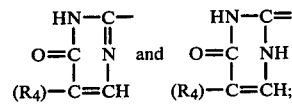

(c) alkylene urea, with $R_1$ and $R_2$ of the corresponding respective formulae:

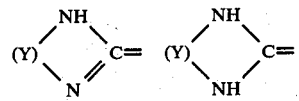

(d) benzothiazol, with $R_1$ and $R_2$ having respectively the formulae:

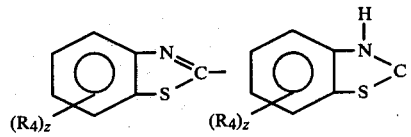

$R_3$ = H, or a metal belonging to Group II (A) or (B) of the Periodic System, or aluminum;
$R_4$ = alkyl radical containing from 1 to 4 carbon atoms, or a halogen;
Y = an alkylene radical containing from 2 to 3 carbon atoms, or an alkylene radical containing substituent groups $R_4$;
n = valency of metal $R_5$;
z = a number comprised between 0 and 3, extremes included.

2. Compositions according to claim 1, wherein the sulphur-nitrogenous compound is selected from the group consisting of mercaptobenzoimidazol, 4-methyl-thiouracyl, thiouracyl, ethylenethiourea, mercaptobenzothiazol and their alkyl and halogenated derivatives.

3. Self-extinguishing polyolefinic compositions according to claim 1 in which, in the formulae for $R_1$ and $R_2$ in the benzothiazol (d), $R_4$ is chlorine.

* * * * *